United States Patent [19]
Wesp

[11] 3,765,972
[45] Oct. 16, 1973

[54] PROCESS FOR ADHERING PREFORMED RESINOUS COVERINGS TO ARCHITECTURAL SURFACES

[75] Inventor: George L. Wesp, Ballwin, Mo.

[73] Assignee: Monsanto Company, St. Louis, Mo.

[22] Filed: Jan. 21, 1971

[21] Appl. No.: 108,637

Related U.S. Application Data

[62] Division of Ser. No. 842,086, July 14, 1969, Pat. No. 3,578,548.

[52] U.S. Cl.................... 156/71, 156/78, 156/330, 161/161, 161/184, 161/252
[51] Int. Cl...................... B32b 25/08, B32b 27/38
[58] Field of Search................... 156/78, 330, 71; 161/184, 161, 252; 260/2.5 L, 2.5 EP, 2.5 AG

[56] References Cited
UNITED STATES PATENTS

| | | | |
|---|---|---|---|
| 3,367,991 | 2/1968 | Hicks | 161/184 X |
| 3,310,507 | 3/1967 | Shepherd | 260/2.5 EP |
| 3,348,988 | 10/1967 | Wagner et al. | 156/71 |
| 3,367,992 | 2/1968 | Beardon | 161/184 X |
| 3,370,104 | 2/1968 | O'Brien et al. | 161/184 X |
| 3,399,248 | 8/1968 | Wolinski | 161/184 X |
| 3,406,131 | 10/1968 | Kuhlkamp et al. | 260/2.5 EP |
| 3,525,703 | 8/1970 | Iwami et al. | 161/184 X |
| 3,578,548 | 5/1971 | Wesp | 156/78 X |
| 3,615,975 | 10/1971 | Gillern et al. | 161/161 X |
| 3,690,987 | 9/1972 | Curran et al. | 156/71 X |

Primary Examiner—Harold Ansher
Attorney—John L. Young et al.

[57] ABSTRACT

A process for applying preformed resinous coverings to architectural surfaces such as floors, walls and the like comprises adhering a covering to a surface with a pressure-sensitive adhesive which, upon contact after drying, develops an immediate bond of high cohesive strength between the surface and the covering that becomes a permanent moisture-resistant bond. The adhesive compositions comprise a latex and a transient tackifier which comprises an epoxy resin and a curing agent. Some adhesive compositions may be foamed to provide a conformable smooth supporting surface for a high modulus preformed resinous covering. The architectural surface, preformed resinous covering and pressure-sensitive adhesive containing a transient tackifier comprise a useful architectural surface composite for residential and commercial installations.

33 Claims, No Drawings

3,765,972

PROCESS FOR ADHERING PREFORMED RESINOUS COVERINGS TO ARCHITECTURAL SURFACES

This application is a division of applicant's copending application Ser. No. 842,086 filed July 14, 1969, now U.S. Pat. No. 3,578,548.

BACKGROUND OF THE INVENTION

The present invention relates to the application of preformed resinous coverings to architectural surfaces such as floors, walls and the like. A principal feature of the invention relates to the application of high modulus resinous coverings to architectural surfaces. Another feature relates to the application of high modulus resinous coverings to irregular architectural surfaces by interposing between said coverings and said surfaces a foam layer which provides a conformable supporting surface for said coverings. Still another feature of the present invention relates to a process for slidably positioning said coverings in contact with said surfaces for a short time after application of the adhesive compositions of this invention.

In recent years a wide variety of preformed architectural surface coverings have been developed to enhance the durability and aesthetics of such surfaces. Such coverings include vinyl and fabric wall coverings, vinyl, rubber and lineoleum floor tile as well as new preformed high modulus resinous surface coverings particularly designed for excellent durability even in areas of hard use and high levels of pedestrian traffic.

A problem encountered in the installation of flexible floor coverings has been the lack of a suitable ashesive system for non-porous coverings installed on architectural surfaces below ground level or below grade. With many current adhesive compositions the bond between covering and surface is gradually destroyed by the moisture escaping from the ground. A system for applying non-porous coverings to below grade surfaces which results in a strong bond between covering and surface even under conditions of high moisture would fill this long standing industry need.

Similarly, as the problems of application of flexible floor coverings continue after years of industry use, experience in installing preformed high modulus resinous coverings has shown a need for an improved process for application of these surface coverings to architectural surfaces such as floors. Whereas the former covering materials have varying degrees of flexibility, or cold flow, which allow them to conform readily to variations in the surface to which they are applied, the latter high modulus materials are rigid at normal temperatures of use so that these coverings do not conform or strongly resist conforming to such variations. Since the high modulus coverings do not readily conform to surface variations in the architectural surfaces, past practice, for ceramic and stone coverings, has been to apply to the surface a moist cement composition referred to in the art as "mud", and set in it (tile-setting) the rigid covering. Skilled artisans would level each piece by causing the "mud" to flow from the high spots by carefully tapping the rigid covering in the proper places. As labor costs in general increased and artisans skilled in tile and stone setting dwindled in number, this type of installation became economically unattractive for all but specialized applications. Many new approaches have been proposed to solve the need for an economic process for applying high modulus coverings to non-flat architectural surfaces, but none have met the requirement that the process have reasonable economics but provide an instantaneous strong bond capable of holding coverings designed for heavy use in place and tight against the architectural surface.

Conventional room temperature setting adhesives which set in the temperature range of 20° to 30° C.(68° to 86° F.) ordinarily used with flexible floor coverings have inadequate initial bond strength to prevent separation of the tile and the surface and residual volatiles may also cause curling. These include asphaltic cutbacks, non-asphaltic mastics, epoxy and urethane adhesives. Such adhesives form a "suction" bond of zero strength bond when the covering is placed on the surface to which adhesive has been applied. The adhesive wets the covering but does not constrain its movement or form an adhesive bond of any measurable strength until dry or cured. The asphaltic and non-asphaltic mastics depend on a high level of water or solvent to wet the covering. In certain coverings the vehicle will cause warpage or curling of the covering. Such adhesives must be applied to the architectural surface and the covering placed in contact with the adhesive while it is still wet. However, such adhesives do not set until dry. Until setting the mastics will flow under load. Depending on the nature of the covering and the surface, the time until set may vary from a few hours to several months. Similarly, epoxy and urethane adhesives, although they contain no vehicle, will flow under load until cured. Time to cure will vary widely depending on conditions and formulation. Prior to set or cure of a conventional adheseive no bond strength is measurable.

Pressure-sensitive adhesive systems, now on the market, are too expensive, cause safety hazards because of high volatile solvent content, or result in an inadequetely bonded system. A pressure-sensitive adhesive is applied to a substrate from a water or solvent system. If it is applied to the covering off-site, extra costs for strippable backings, extrahandling, wastage and the like raise costs beyond those of competitive systems. Application of a pressure-sensitive adhesive on-site from a solvent system presents a variety of safety and technical problems. Present water-based pressure-sensitive systems give an inadequate bond.

Solvent based systems containing highly volatile solvents present a health and fire hazard when used to adhere coverings to architectural surfaces. since application of the adhesive to large areas releases large volumes of solvent into the air, safe use in enclosed areas is difficult. High volume ventilation must be provided. Ignition sources must be removed and excluded. Certain solvents may cause respiratory or skin reactions. Although high bond strengths may be obtained with such systems, the difficulties attendant to their application make solvent-based pressure-sensitive adhesives impractical for general use in applying coverings to architectural surfaces. When low volatility solvents are used, surface-skinning, low bond strength and softening of applied resinous coverings result from the slow rate of solvent release.

Water-based pressure-sensitive adhesives do not present such severe health and safety hazards in their application. However, the bond produced is sensitive to moisture. High bond strength under moist conditions is needed in an acceptable adhesive since the usual method for cleaning covered architectural surfaces utilizes detergents and water and it is likely that regardless of the surface location, the bond will be contacted with water or moisture at joints, cracks, etc. Where the architectural surface is below grade or ground level, high band strength under moist conditions is particularly necessary because of moisture escaping through the architectural surface from the ground. A system is needed that would give a strong permanent bond between a covering and a surface which is not flat whether the complete covering system is subjected to use under moist or dry conditions.

A process for adhering preformed resinous coverings to architectural surfaces which utilizes a pressure-sensitive adhesive that would maintain high cohesive strength under wet or dry conditions would fulfill these industry needs, provide an improved process for application of high modulus and flexible preformed resinous coverings and constitute a distinct advancement in the art.

A further need has developed for a new process to apply a high modulus preformed resinous covering to an irregular architectural surface. Small abrupt irregularities prevent contact of the rigid covering with the thin coating of adhesive applied to the surface, this interrupting the bond of the adhesive between covering and surface. An economic process which would provide a means to fill the gaps between surface and covering and allow the adhesive to develop its full bond strength without interruption across the full dimension of the architectural surface would provide an advancement of the art and open a wide range of markets to the new high performance, high modulus preformed resinous coverings recently developed.

The use of various resilient foams as underlayment for coverings applied to architectural surfaces is known. It is taught that such pliable foams when applied under flexible surface coverings give the covering a three-dimensional aesthetic eye-appeal as well as a soft, resilient, luxurious feel to the touch. However, the use of foams as an integral part of a process developed to adhere high modulus preformed resinous coverings to irregular architectural surfaces by providing a conformable smooth supporting surface for the covering despite abrupt irregularities in the architectural surface which results in uniform intimate bonding contact between the surface and the covering is a new solution to a serious industry problem. Likewise, if instead of using a separate foam layer which must be adhered to the irregular surface as well as to the covering, the adhesive could be in the form of a foam so that it would perform the dual function of adhering the covering to the surface and providing a conformable smooth surface to support the covering, the process of applying the covering to the irregular surface would be even more economical. With such a low cost installation process, a preformed high modulus resinous covering, offering durability and aesthetic appeal, could be utilized in a great number of applications now unattainable because of high installation costs.

In adhering coverings to architectural surfaces with pressure-sensitive adhesive compositions under certain circumstances, where difficulties are encountered in fitting the covering into place as where fixtures project from the architectural surface or objects overhang the surface or where the covering is to be applied where space is severely limited, it would be very helpful to control the development of initial tack of the adhesive composition so that the covering in contact with the surface could be slid into the desired position. If such means for controlling development of initial tack of the adhesive composition would not adversely affect the ultimate bond strength of the adhesive composition under either wet or dry conditions it would also constitute a new and useful advancement of the art.

SUMMARY OF THE INVENTION

The process of this invention comprises adhering a preformed resinous covering to an architectural surface by a pressure-sensitive adhesive composition comprising a latex and a transient tackifier, which transient tackifier comprises an epoxy resin and a curing agent. Adhesive compositions of this invention comprise a latex and a transient tackifier, which transient tackifier comprises an epoxy resin and a curing agent. Architectural composites of this invention comprise a preformed resinous covering and an architectural surface and a pressure-sensitive adhesive composition comprising a latex and a transient tackifier, which transient tackifier comprises an epoxy resin and a curing agent.

DESCRIPTION OF THE PREFERRED EMBODIMENTS

The term preformed resinous coverings as used herein refers to solid materials having a definite discrete shape form such as floor tile. This is in contact to materials in liquid form or in a flowable state which can be applied to a floor or other surface and which form a covering upon solidification or drying such as a floor wax composition. Although floor tile represents one popular and readily recognizable form of a preformed resinous floor covering useful herein, the process of applicants' invention is not limited to using floor tile since the process of this invention is particularly suitable for applying large sections much larger than conventional tile. Floor tile customarily has a thickness of about 1/16 to about 3/16 inch, and a length and width from about eight to nine to about 12 or 14 inches. In addition to such suitable sizes, coverings useful herein can vary in thickness from 1/32 inch or less up to one inch or more. Length and width dimensions of coverings useful in the process of this invention can also be both smaller and larger than the customarily floor tile dimensions. Some suitable coverings can have lengths and widths of six feet or more. Suitably sized shapes include those about 36 by 36 inches, 48 by 48 inches, 24 by 48 inches, and other similar dimensions. The process and compositions of this invention are equally useful with a wide variety of resinous coverings having resinous binders exemplified by, but not limited to, inexpensive-hydrocarbon resins, polyvinyl chloride, vinyl copolymers, styrene-butadiene, polyalkyl methacrylate, and the like.

In preferred embodiments of the process of this invention, preformed high modulus resinous coverings are adhered to architectural surfaces. Preformed high modulus resinous coverings as used herein refer to solid materials having a flexural modulus of 1,000,000 p.s.i. or more and having a definite discrete shape in sheet form such as floor tile. The composition of the preformed high modulus resinous coverings is not a critical feature of this invention. A preferred embodiment of the process of this invention is to provide a smooth support surface for a high modulus covering having a flexural modulus of 1,000,000 p.s.i. or more without limitation to the composition of the covering and to adhere such a covering to such a surface.

A typical covering may comprise from about 10 to about 95 percent by volume based on the total composition of an inorganic filler having a Mohs' hardness of at least about 4, and from about 90 percent to about 5 percent by volume based on the total composition of a polyalkyl methacrylate such as polymethylmethacrylate. Such a typical composition may also be modified by the addition of a rubbery polymer, fibrous reinforcement, or other additives. Other resins which can also be satisfactorily used herein include polyvinyl chloride, nylon, polystyrene, styrene-butadiene copolymers, styrene-acrylonitrile copolymers, ethylene vinyl chloride copolymers and the like.

The adhesive compositions of this invention are also useful in bonding a wide variety of materials, both products of nature and articles of manufacture ranging from very flexible to rigid, to a multiplicity of surfaces and objects wherever a strong permanent bond is desired under either dry or moist conditions of use.

The term architectural surface as used herein refers to the various horizontal, vertical and diagonal exterior and interior surfaces of a building which can exist in the form of walls, ceilings, floors, room dividers, doors and the like. The architectural surface can be of any solid, cohesive, rigid material such as wood, slate, concrete or terazzo. In addition, the surface can be covered with a variety of materials such as linoleum, paint or old vinyl tiles prior to the application of the covering compositions of this invention. An irregular architectural surface is a surface containing small abrupt irregularities as exemplified by nailheads, trowel marks, small protrusions of exposed aggregate or coarse sand particles, tile edges which are slightly raised, pits, gouges, rough grained wood, and the like. While the height or depth of these irregularities will vary widely, many irregularities will have a height or depth on the order of about 1/32 inch or less.

In contrast to the above described abrupt irregularities is the unevenness of a trowelled concrete floor. Although appearing flat and level, most concrete floors are characterized by an undulating or wavy surface with variation from a peak to a valley varying from 1/32 inch to 1/8 inch or more. Such deviations from generally flat plane of the architectural surface are gradual variations and not abrupt irregularities.

"To adhere" is defined by the Americal Society for Testing and Materials as "to cause two surfaces to be held together by adhesion," Terms Relating to Adhesives, D 907–67, 16 ASTM Stds. 286 (1968). Adhesion is "the state in which two surfaces are held together by interfacial forces which may consist of valence forces or interlocking action or both," Id. 286.

A pressure-sensitive adhesive is defined as "an adhesive made so as to adhere to a surface at room temperature by briefly applied pressure alone," Id. 287. Pressure-sensitive adhesives known in the art usually consist essentially of a linear high polymer which may be crosslinked plus a low molecular weight tackifying additive. Said adhesives are applied to the substrate surface as a dispersion in water or solvent.

Bond strength is defined as "the unit load applied in tension, compression, flexure, peel, impact, cleavage, or shear, required to break an adhesive assembly with failure occurring in or near the plane of the bond," Id. 288. Cure is a "change in the physical properties of an adhesive by chemical reaction, which may be condensation, polymerization, or vul-canization; usually by the action of heat and catalyst along or in combination, with or without pressure," Id. 288. Flow is "movement of an adhesive during the bonding process, before the adhesive is set," Id. 289. An adherend is "a body which is held to another body by an adhesive," Id. 286. A set is "the conversion of an adhesive to a hardened state by chemical or physical action, such as condensation, polymerization, oxidation, vulcanization, gelation, hydration, or evaporation of volatile constituents." Id. 291. When an adhesive sets, it loses its tack and it will no longer flow, but it may or may not increase its bond strength depending on the nature of its formulation. Tack is "the property of an adhesive that enables it to form a bond of measurable strength immediately after adhesive and adherend are brought into contact under low pressure," Id. 292.

A wide variety of latices are useful in the practice of this invention. Especially good and outstanding results are obtained with certain latices which are particularly described. In the description of latices and other components useful in this invention, the following terms are used for brevity and have the meanings shown:

| Term | Meaning |
| --- | --- |
| acrylic ester | an ester of acrylic or methacrylic acid, |
| unsaturated acid | acrylic acid, methacrylic acid, crotonic acid, or monoesters of maleic or fumaric acid. |
| hydroxyl functional monomer | hydroxy ethyl or hydroxy propyl acrylates or methacrylates, N-methylol acrylamide or methacrylamide. |

To obtain a good bond the adhesive composition must form a film. The process of this invention is designed for use generally at ambient room temperature. The temperature at which a composition will form a film may be altered by a variety of additives. There is no need to raise the film forming temperature of a composition of this invention since film forming temperature has no critical effect on the practice of this invention so long as it is below the temperature at which the invention is practiced. However, to obtain optimum bond strength the film forming temperature should be below that at which the invention is practiced.

The latex portion of the adhesive compositions of this invention provides the film-forming capability of the composition. Beyond its capability to form a film in conjunction with the other components of the adhesive composition, the properties and composition of the latex are not critical to the practice of the invention. Acrylic latices because of their inherent resistance to oxidation and hydrolysis may be preferred when an adhesive of long service life is being formulated. Latex constituents may vary widely. Latices with a tendency to entrain air may be preferred if a foam adhesive is being formulated. Still other latices may be preferred because of their tendency not to entrain air if a non-frothing adhesive is desired.

Latices preferred in the practice of this invention comprise acrylic ester-unsaturated acid copolymers; acrylic ester-glycidyl acrylate copolymers; acrylic ester-hydroxyl functional monomer copolymers; acrylic ester-vinyl ester hydroxyl, carboxyl or glycidyl functional monomer terpolymers; acrylic ester-butadiene of isoprene-hydroxyl, carboxyl or glycidyl functional monomer terpolymers; acrylic ester-vinyl ether-hydroxyl, carboxyl or glycidyl functional monomer terpolymers; and acrylic ester copolymer latices. Each of the above preferred latices may be used as a latex component of an adhesive composition of this invention by itself or in combination with any of the other latices listed in any proportions. An acrylonitrile-butadiene or isoprene-unsaturated acid terpolymer or other carboxylated nitrile rubber latices may be used as a latex component in the amount of from 0 to about 70 percent by weight of total latex solids in combination with the latices listed above. For particularly long service life still more preferred latices comprise acrylic ester-unsaturated acid copolymers, acrylic ester-hydroxyl functional monomer copolymer and combinations of either of the above two more preferred latices with a latex of acrylonitrile-butadiene or isoprene-unsaturated acid terpolymer in which combinations said terpolymer solids comprise from 0 to 60 percent by weight of the total latex solids of the combination.

Polymeric solids of the latex comprise from about 40 to about 95 percent by weight of the total solids content of the adhesive compositions of this invention. In preferred embodiments, latex solids comprise from about 50 to about 94 percent by weight of the total solids content. In more preferred embodiments latex solids comprise from about 55 to about 92 percent by weight of total solids content.

The total solids content of latices useful in this invention may vary over a wide range. Adhesive compositions with high bond strength may be achieved with latices having either low or high total solids content. Foamed adhesive compositions may be prepared more easily with higher solids content latices since these foam more readily. A preferred range of solids content is from about 30 to about 60 percent solids. A more preferred range of solids content is from about 40 to about 55 percent solids.

A tackifier is any additive which imparts to a composition pressure-sensitive properties or enhances the pressure-sensitive properties of a composition. Typical tackifiers include plasticizers, low melting point, low molecular weight resins such as rosin esters, phenolic resins, coumarone-indene resins, etc., or other materials which tend to lower the $T_g$ glass transition temperature, of the composition. Such additives generally lower the bond strength, both initial and ultimate, of the composition particularly under moist conditions.

A transient tackifier imparts or enhances pressure-sensitive properties for only a limited period of time because of its capability of curing at room temperature. The idea of using a material which will cure to a thermoset structure to impart temporary pressure-sensitive properties to a latex polymer is novel in the architectural surface adhesive art and it is particularly remarkable that this capability has been found in certain epoxy resin-curing agent systems which have excellent adhesive properties when fully cured. Thus, though the transient tackifier lowers initial cohesive bond strength of the composition while it imparts pressure-sensitive properties to it, the transient tackifier substantially increases bond strength of the composition upon cure well beyond the level of permanent pressure-sensitive adhesives of comparable initial cohesive strength. An even greater increase in bond strength is noted when the composition is used in moist locations because of the unique effect of a transient tackifier in decreasing the anti-bonding properties and water-sensitivity of surfactants, water soluble colloids and other additives which is exactly contrary to the results obtained when conventional tackifiers are employed. A transient tackifier may be used in conjunction with a conventional tackifier. Indeed, a preferred embodiment of this invention utilizes along with a transient tackifier a low moisture sensitive tackifier to extend the time duration of pressure-sensitive properties of the adhesive composition.

The unique adhesive compositions of this invention develop tack only upon drying and retain it for several days after all volatiles have been removed. "To dry" is defined as "to change the physical state of an adhesive on an adherend by the loss of solvent constituents by evaporation or absorption or both, " Id. 289. In the practice of this invention dryness is determined by touching the surface of the applied adhesive. If the adhesive composition is dry to the touch except for a slight surface tack and does not pull apart or pull away from the substrate when the touching member is removed, then the adhesive composition is considered to be dry. Whereas a number of adhesives, referred to as contact adhesives, exhibit tack when two adherends, each with a given adhesive applied to its contacting surface, are placed in contact with each other, the adhesives of this invention are truly pressure-sensitive and exhibit tack when a substrate on which they are applied, is placed in contact with an adherend on which no adhesive has been applied. Pressure sensitive adhesives used in the process of this invention, since they develop an immediate high bond strength upon contact with an adherend, are particularly well suited for installing coverings on architectural surfaces subject to high level of use and heavy traffic because the area being covered is withheld from normal use for only a minimum of time. For example, an area of a public walkway in a subway station could be used during the evening rush hour of the same day it was installed. High instantaneous bond strength is also important in applying heavy duty coverings having substantial mass to architectural surfaces and particularly to surfaces which are not horizontal. The fact that the pressure-sensitivity of these compositions is developed only when dry means that the process of this invention is ideally suited for non-porous adherends since there are no volatiles to be removed after contact. Their high ultimate bond strength even in the presence of high moisture level environments makes the adhesive compositions used in the process of this invention especially useful for adhering non-porous coverings to below ground level architectural surfaces. Further advantages of the process and compositions of this invention will become clear from the detailed explanation and examples of this invention.

Although a wide variety of epoxy resins may be used in the practice of this invention, preferred epoxy resins comprise glycidyl ethers of aliphatic polyols, glycidyl ethers of phenols containing more than one phenolic group such as 2,2 isopropylidene-4,4'-diphenol, cashew-nut oil phenols, novolac resins, and the like, and mixtures of the aforementioned polyol and phenol epoxy resins. Such resins are useful in 100 percent solids form or in an organic solvent such as mineral oil, toluene, methylisobutyl ketone and the like. Sometimes the use of a solvent with the epoxy resin aids dispersion of the epoxy resin in the latex. It is more preferred in the practice of this invention that an epoxy resin have an epoxy equivalent weight of from about 100 to about 1500 or still more preferred from about 150 to about 1000.

Likewise, practically all of the commercially available ambient temperature curing agents for epoxy resins may be used in the practice of this invention. Suitable curing agents may be water soluble or insoluble. Usual practice is to add the curing agent directly to the latex or mixture of latex and epoxy resin without prior addition of water or solvent. However, water or an organic solvent may be added to the curing agent to reduce its viscosity so that the curing agent may be more readily dispersed by mechanical stirring. Examples of room temperature curing agents useful in this invention include, but are not limited to, ethylenediamine, diethylenetriamine, triethylenetetramine, tetraethylenepentamine, N-(hydroxyethyl) diethylenetriamine, N,N'-bis (hydroxyethyl) diethylenetriamine, cyanoethyl diethylenetriamine, m-xylylenediamine, adducts of a liquid epoxy resin and any of the above polyamines, diethylaminopropylamine, dimethylaminopropylamine, m-phenylenediamine, and amino-modified polamides. Curing agents are effective when used alone or in mixtures of curing agents to obtain desired cure characteristics. Good results have been obtained with a variety of modified and unmodified polyamine curing agents. Higher molecular weight amino-modified polyamides, however, require care when mixing with the latex component to prevent coagulation of the latex. Adhesive compositions containing such polyamide curing agents exhibit high bond strength under dry conditions but, under moist conditions, bond strengths are lower than for adhesive compositions containing polyamine curing agents. Particularly good results have been obtained with aliphatic amines exemplified by diethylene triamine, triethylene tetramine and the like, with aliphatic polyamines modified by partial reduction of amine functionality with ethylene oxide or propylene oxide, and with aliphatic polaymaines modified by partial reaction of amine functionally with polyglycidyl ethers exemplified by gylcidyl ethers of aliphatic polyds and glycidyl ethers of phenols containing more than one phenolic group. The amount of curing agent used in adhesive compositions of this invention is related to the amount of epoxy resin used.

The length of time that the epoxy resins and curing agents of this invention act as transient tackifiers and impart pressure-sensitivity to the adhesive compositions varies inversely with the ratio of curing agent to epoxy resin. Less than the stoichiometric ratio of curing agent to epoxy resin gives a longer period of pressure-sensitivity. More than the stoichiometric ratio of curing agent to epoxy resin gives a shorter period of pressure-sensitivity. In the practice of this invention a preferred range of the amount of curing agent in relation to the stoichiometric amount of curing agent to fully react with the epoxy resins is from about 25 to about 200 percent by weight of the stoichiometric amount. A more preferred range is from about 50 to about 150 percent of the stoichiometric amount and a still more preferred range is from about 80 to about 120 percent. Depending on the particular composition constituents and the properties desired, an amount of curing agent more or less than the above preferred ranges may be used.

The combination of epoxy resin and curing agent comprise the transient tackifier in adhesive compositions of this invention. The amount of transient tackifier in any given composition will depend on the particular latex used, its interaction with the transient tackifier, the ultimate bond strength of the composition desired, the initial level of tack method needed and a variety of other variables. A preferred range for the amount of transient tackifier in an adhesive composition of this invention is from about 5 parts by weight of the combination per 100 parts by weight of latex solids to about 50 parts by weight of the combination per 100 parts by weight of latex solids. A more preferred range is from about 10 parts to about 40 parts by weight of the combination per 100 parts by weight of latex solids. As a result of the combination of an epoxy resin and a curing agent acting as a transient tackifier to give pressure-sensitive properties to said compositions for only a limited period of time, adhesive compositions of this invention give not only an instantaneous strong initial bond but also a high strength permanent bond with high moisture resistance. In the practice of this invention, it is preferable to use only transient tackifiers to obtain the maximum bond strengths under both dry and moist conditions.

Other tackifiers may be used, however, in conjunction with transient tackifiers to lengthen the period of time that the adhesive compositions have pressure-sensitive properties without diminishing their ultimate bond strength particularly under moist conditions. Preferred tackifiers are low molecular weight polymers which are insoluble in water but soluble in alkaline aqueous media and organic solvents which polymers comprise an acrylic ester-unsaturated acid copolymer or an acrylic ester poylmer, more preferably a partially hydrolyzed acrylic ester and unsaturated acid copolymer or an acrylic ester polymer having a molecular weight from about 2,000 to about 8,000 and an acid number of from about 55 to about 70. Such tackifiers are preferably added as an ammonium salt or as the salt of a primary, secondary, or tertiary non-aromatic amine to the aqueous phase of the latex component of the adhesive compositions of this invention preferably in the amount of from 0 to about 40 parts by weight per 100 parts by weight of latex solids, more preferably in the amount of from 0 to about 25 parts by weight per 100 parts by weight of latex solids.

A preferred embodiment is a process for applying a preformed high modulus resinous covering to an irregular architectural surface. In this embodiment, in addition to adhering the high modulus covering to the surface using the unique adhesive compositions of this invention, a conformable smooth supporting surface is provided for the preformed high modulus resinous covering by interposing between the covering and the surface a foam layer.

The foam layer may be utilized in sheet form. Foams useful in the practice of the process of this invention are selected for their ability to permit intimate bonding contact between the covering and the surface which supports the covering so that strains are reasonably well distributed when the covering is subject to the stress of normal expected use. Thus a rigid foam which can be made to conform to the irregular and architectural surface by crushing the cell structure on one of its faces while the other face provides a smooth suport for the covering would be as useful as a flexible foam one face of which conforms to the irregular architectural surface by non-resiliently deforming while the other face supports the covering so that strains are not excessively concentrated in any single spot to cause failure of the covering. Suitable forms may be obtained by mechanically or chemically framing polymers exemplified by but not limited to the following: polyvinyl chloride, polystyrene, polyurethane, polyethylene, polypropylene, phenolformaldehyde resins and the like. A variety of such foams are carried in stock by supply houses. A primer may be applied to a surface of the foam to increase adhesive bond strength.

Where a separate foam layer is interposed between the preformed high modulus resinous coating and the irregular architectural surface, such foam layer may be adhered to the covering or surface in a number of ways as exemplified but not limited to the sequences listed below:

1. Apply adhesive to irregular architectural surface. Place foam on irregular architectural surface. Apply adhesive to upper surface of foam. Plate covering on foam.
2. Apply adhesive to covering. Place foam on covering. Apply adhesive to irregular architectural surface. Place foam and covering combination on irregular architectural surface.
3. Apply adhesive to irregular architectural surface. Place foam on irregular architectural surface. Apply adhesive to covering. Place covering on foam.
4. Apply adhesive to lower surface of foam. place foam on irregular architectural surface. Apply adhesive to upper surface of foam. Place covering on foam.
5. Apply adhesive to upper and lower surfaces of foam. Place foam on irregular architectural surface. Place covering on foam.
6. Apply adhesive to upper and lower surface of foam. Place foam on covering. Place foam and covering on irregular architectural surface.
7. Apply adhesive on irregular architectural surface, covering, and upper and lower surfaces of foam. Place foam on irregular architectural surface. Place covering on foam.

In the sequence above, the upper surface of foam is the surface on which the covering is placed, the lower surface of foam is the surface which is placed on the architectural surface, and adhesive is applied to the covering on the surface not designed for exposure to wear.

In a preferred embodiment of the process of this invention, an adhesive composition is prepared and agitated at a high speed whereby it forms a foam. The foam is then applied to an irregular architectural surface, a preformed high modulus resinous covering, or both and provides a smooth supporting surface for said covering and a strong adhesive bond between said covering and said architectural surface. The adhesive composition comprises a latex, an epoxy resin, a curing agent, a surfactant and a water-soluble colloid.

A surfactant or surface active agent is "any compound that affects (usually reduces) surface tension when dissolved in water or water solutions, or which similarly affects interfacial tension between two liquids," Rose, The Condensed Chemical Dictionary, 1098 (6th Ed, 1961). In this embodiment the surfactant lowers the surface tension of the solution so that with agitation air is readily entrained in it and a foam is formed. Most latices already contain surfactants so that, as a result, little or no additional surfactant may be required to form the desired foam in many cases.

A water-soluble colloid increases the viscoisty of the aqueous phase of the foam and stabilizes the foam against collapse during drying. Surfactants and water-soluble colloids are selected:

1. to promote uniform foaming with fine pores,
2. to stabilize the foam structure during spreading and drying,
3. to disperse the epoxy resin component,
4. to stabilize the adhesive mixture against coagulation by high speed stirring, and
5. to not interfere with bonding.

Anionic and nonionic surfactants in the amount of from 0 to about 3 parts by weight per 100 parts by weight of latex solids are preferred in the practice of this invention. For the ultimate in bond strength under moist conditions it is more preferred that the surfactant be present in the amount of from 0 to about 2 parts by weight per 100 parts by weight of latex solids. Examples of suitable anionic emulsifiers include sodium dodecylbenzene-sulfonate, sodium decylbenzenesulfonate, ammonium laurylbenzenesulfonate, potassium stearylbenzenesulfonate, sodium stearylsulfate, potassium myristylnaphthalenesulfonate, potassium oleate, sodium laurate, ammonium dodecylphenoxypolyoxyethylene ethyl sufate, soduim lauryl sulfate, nonylphenoxy acetic acid, sulfated cresylic acid, disodium-N-octadecylsulfosuccinamate, tetrasodium N-(1,2-dicarboxyethyl)-N-octacdecylsulfosuccinamate, diamyl ester of soidum sulfosuccinic acid, dihexyl ester of sodium sulfosuccinic acid, bis (tridecyl) ester of sodium sulfosuccinic acid, dioctyl sodium sulfosuccinate, sodium dodecyl diphenyl oxide disulfonate, benzene potassium sulfonate, sodium salt of a sulfonated naphthaleneformaldehyde condensate, sodium salt of polyethoxy alkyl phenol sulfonate, sodium oleyl methyl tartrate, and triethanolamine salt of polyethoxy alkyl phenol sulfonate. Examples of suitable nonionic emulsifiers include alkyl aryl polyether alcohols such as lauryl phenyl polyether ethanol, alkanol, amine fatty condensates such as triethanolamine, coconut fatty acid ethanolamide, lauric acid propanolamide, fatty alcohol polyglycol ether, myristyl phenyl polyglycol ether, polyoxyethylene monooleate, polyoxyethylene sorbitol septaoleate, polyoxyethylene sorbitol oleate laurate, polyoxyethylene cetyl alcohol, polyoxyethylene stearyl alcohol, a blend of sorbitan monostearate and and polyoxyethylene stearate, glycolamido stearate, and other polyoxyethylene alkanols and alkyl phenols reacted with 2 to 40 moles of ethylene oxide per mole of alkanol or alkyl phenol. More preferred surfactants are those known to be active in alkaline or acid media and in the presence of metal and exemplified by but not limited to the following: alkyl phenol ethylene oxide adducts, alkyl alcohol ethylene oxide adducts, condensed phosphate ester salts, sulfonates of ethoxylated alkyl aryl phenols, aklyl sodium sulfates, alkylolamide condensates and the like.

Still more preferred surfactants include alkyl phenols having from eight to 13 carbon atoms in the alkyl group reacted with 10 to 50 equivalents of ethylene oxide, condensed phosphate ester salts, and sulfonates of ethoxylated alkyl aryl phenols. Particularly outstanding results have been obtained with alkyl aryl ethylene oxide adducts.

Water-soluble colloids useful in this invention are water or aqueous alkaline soluble high polymers, i.e., of molecular weight in excess of 20,000, which confer shear stability, foam stability or both to the adhesive compositions of this invention when used preferably in the amount of from about 0.01 to about 2 parts by weight per 100 parts by weight of latex solids. A more preferred amount is from about 0.03 to about 1.5 parts by weight of latex solids and still more preferred from about 0.05 to about 1 part by weight per 100 parts by weight of latex solids. Among the many water soluble colloids useful in this invention are the following illustrative examples of preferred materials: casein, polyacrylamide, carboxy cellulose ethers, carboxylated poylacrylamides, acrylamide-unsaturated acid copolymers, acrylic ester-acrylic or methacrylic acid copolymers, polyacrylate salts, ammonium salt of amidated ethylene maleic anhydride, salts of sodium carboxymethyl cellulose, cellulose hydroxy ethers, polyvinyl alcohols of various molecular weight and a vinyl acetate content of from about 40 to 0 pecent. More preferred water soluble colloids include polyacrylamide, polyacrylate salts, and sodium carboxymethyl cellulose. Particularly outstanding results have been obtained with polyacrylamide and sodium carboxymethyl cellulose.

In practicing the process of this invention, it is preferred that the three major components of an adhesive composition of this invention, the latex, epoxy resin, and curing agent, be maintained separate from each other until about four hours before a composition is to be applied to the adherends. More preferably the components should be maintained separate from each other until about two hours or even as little as one hour before application.

The adhesive compositions of this invention may be applied to the preformed resinous covering, the architectural surface or both. The covering may then be placed in contact with the surface as soon as the adhesive surface is dry to the touch. If it is preferable to delay placing the adherend in contact with the adhesive for several hours, overnight, or, if necessary, over a weekend, the pressure-sensitive properties of the adhesive compositions of this invention are such that a strong bond is obtained up to about three days after the adhesive was originally applied. The length of time after mixing, application and drying that adhesive compositions of this invention can maintain their excellent pressure-sensitive properites without loss of ultimate bond strength can readily be varied by formula adjustment to accommodate such delays in application of coverings as are encountered in normal commercial installation procedures.

In the embodiment of this invention wich utilize foamed adhesives, it is not critical that a surfactant and water-solubic colloid which may be needed to assure a stable foam upon application to an adherend be kept separate from the other components until the final mixing before application or whether they are added to any one of the components prior to mixing. Good results have been obtained when the surfactant and protective colloid have been added to the latex alone, to the curing agent alone or to the mixture of the three components together.

As in mixing a non-foamed adhesive where conventional mixing equipment is used, so too in foamed adhesives the design of mixing equipment is not critical to the practice of the invention. It is preferable, however, that the mixing equipment provide a vortex for entrainment of air, a dip-tube for introduction of air, or induction of air by centrifugal means to facilitate foam formation. The length of mixing time for proper foam development will vary with the type of mixing equipment.

The method of application of the foamed and nonfoamed adhesive compositions of this invention to an adherend is not a critical feature of the invention. It is preferable to apply an even coating of adhesive. Such an even coating can be achieved with conventional equipment but the evenness of the coating, as is the case in applying any adhesive, depends largely on the skill of the applier. The maximum thickness of the coating is limited by the adhesive cost which the covering installation job can bear. The minimum thickness of a foamed or unfoamed adhesive is largely determined by the evenness of the adhesive coating. For maximum bond strength, the adhesive coating should completely cover the surface without uncoated gaps. In addition where an irregular architectural surface is being covered with a high modulus preformed resinous covering using a foamed adhesive the thickness of the adhesive must be sufficient to provide a smooth supporting surface, i.e., at least thick enough to fill the gaps between the resinous covering and the most extensive irregularities after the adhesive composition has dried.

Upon drying, the foamed adhesive compositions of this invention lose from about 20 percent to about 40 percent of its bulk volume as applied. The strength of any given foam composition varies inversely with the ratio of its foamed volume to its prefoamed volume. Thus, in order to be certain that a foam structure remains after cure it is preferable to develop a foam that, when applied, occupies more than about 1.2 times the volume occupied by the composition prior to its being made a foam. To be assured that the foam has adequate strength upon cure, it is preferred that the foam, when applied, occupy less than about four times the volume occupied by the composition prior to its being made a foam. It is more preferred that the foam occupy from about 1.5 to about three times its pre-foamed volume. It is still more preferred that the foam occupy from about 1.8 to about 2.5 times its pre-foam volume, The pressure-sensitive adhesives of this invention develop a strong instantaneous bond when the preformed resinous coverings are placed in contact with the dry surface of the adhesive composition under firm fingertip pressure. Even greater bond strength may be obtained, if desired, by the application of additional pressure through use of rollers, such as those used in the hanging of wall coverings or in the laying of flexible floor coverings using conventional adhesive compositions.

Under certain circumstances a higher bond strength may be obtained by applying a primer to the adherend surface. The primer modifies the surface characteristics of the adherend allowing the adhesive to form a strong bond with it. Particularly good results have been obtained when a polyester urethane composition is used as a primer on foamed as well as non-porous polymeric surfaces such a polyvinyl chloride, polymethyl methacrylate and the like. No primer is used normally on conventional architectural surfaces such as concrete, metal or cellulosic surfaces.

Because of the instantaneous strong pressure-sensitive bond which is formed by the adhesives of this invention, it is not possible to move or shift even small, for example six inch by six inch tiles, panels of the covering once the covering is placed in contact with the dry adhesive surface. In areas where accurate positioning of the tile is restricted, a slip sheet of a release paper may be used and gradually removed as the panel is lowered into place. A more convenient practice is to wipe on either the adhesive surface or the adherend a temporary lubricant solution to temporarily destroy initial tack. Past practice has been to apply an aqueous solution of a wetting agent. Such a solution, however, leaves a film of wetting agent at the interface of the adherend and adhesive which diminishes dry adhesion and more especially adhesion under moist conditions.

A dilute aqueous solution of polyvinyl methyl ether in a concentration from about 0.1 to about 3 weight percent, preferably from about 0.15 to about 2.5 weight percent and more preferably from about 0.2 to about 2 weight percent, serves as a temporary lubricant which temporarily destroys initial tack without diminishing the dry and wet strength of the adhesive bond. The lubricating effectiveness of a polyvinyl methyl ether solution is particularly remarkable in that the prior art recommends this material as an additive to increase the initial tack of a pressure-sensitive adhesive composition. The use of a polyvinyl methyl ether solution allows the applier to slidably position, while the covering and surface are in contact, the covering without loss of tack or bond strength after the solution has dired or has been absorbed by the adherends or adhesive. Several methods for application of the solution of vinyl methyl ether polymer have been used successfully. It may be wiped on with a cloth or applicator moistened with solution, it may be sprayed on, or it may be applied by any other method which deposits a thin film on either or both surfaces which are to be placed in contact with each other. Although other materials are known in the art to destroy tack, the use of a thin film of vinyl methyl ether polymer solution is unique in that upon drying the residual polymer migrates and dissolves into the adhesive composition and becomes an integral part of the bond between adherends. This capability gives the remarkable result that bond strength of the adhesive, wet or dry, is in no way diminished by the use of the polymer solution. This result is particularly important in applying coverings to architectural surfaces which require careful fitting and placement of the covering, which are subject to heavy traffic and hard wear and which, accordingly, require the ultimate in bond strength of the adhesive.

It is apparent from the above descriptions that as a result of the unique characteristics of the adhesive compositions of this invention, the process of this invention, because of its developing high initial and ultimate bond strength even under moist conditions, can be used to apply preformed resinuous coverings to architectural surfaces below grade which could not be accomplished by processes now known in the art and, because of its remarkably outstanding immediate and ultimate bond strength, can be used to apply high performance preformed high modulus resinous coverings to smooth and irregular architectural surfaces to give the ultimate in durability in a surface, adhesive and covering which comprise an architectural surface composite.

The following examples more specifically illustrate some of the preferred compositions and embodiments of the process of this invention.

EXAMPLE 1

This example illustrates the inadequate level of bond strength of a conventional pressure-sensitive latex adhesive after exposure to moist conditions even when the substrate is treated with a primer to enhance bond strength. In this example a high modulus preformed resinous covering is laminated to a 1/32 inch thick plastisol derived plasticized polyvinyl chloride foam of 20 lb/ft$^3$ density. The foam side of the laminate is primed with a thin coating of a polyester urethane primer which serves both as a barrier against plasticizer migration and as a tie-coat for the latex adhesives.

Pieces of cement asbestos board (1inch X 1.5inches X 0.25inch) are coated with an 0.018 inch thick layer of a 42 percent solids (pressure-sensitive solids) vinyl acetate acrylic ester copolymer latex (Franklin Chemical Co., Covinax 82 EXP) containing anionic surfactant and hydroxyethyl cellulose protective colloid. After drying three hours, the above flooring laminate (also 1 inch X 1.5 inches in size) is laid cross-wise on the adhesive coated cement asbestos with the foam on the pressure-sensitive film and pressed with an 18 lb. weight for one minute. The specimens are aged one month at 23° C., then immersed in 50° C. water for one week. At the end of this time the pressure-sensitive film is white and very weak and most of the specimens delaminate by separation of the PVC foam from the pressure-sensitive adhesive under gravitational forces. The intact specimens are so weak that they fall apart during insertion in testing machine grips in an attempt to determine bond strength.

EXAMPLE 2

This example illustrates the remarkably high level of bond strength of an adhesive composition of this invention under both dry and moist conditions and the enhancement of tack for a limited time of a pressure-sensitive adhesive by a tackifier comprising an epoxy resin and a curing agent. It also illustrates an embodiment of this invention which utilizes a foam in sheet form to provide a smooth conformable supporting surface for a high modulus preformed resinous covering. The procedure of Example 1 is used except for the incorporation of an epoxy resin intermediate and a curing agent in the vinyl acetate acrylic latex by high speed stirring for two minutes and using a 1.25 inches diameter X 0.25 inch wide two blade shallow pitched propeller in a 125 ml. metal beaker.

Latex adhesive compsition:
26.00 grams — Example 1 latex.
1.93 grams — 70 percent solution of a glycidated phenol-formaldehyde novolac with an epoxy equivalent weight of approximately 175 (Epon No. 152-Shell Chemical Co.) in toluene.
1.55 grams — 42 percent solids solution in organic solvent of an epichlorohydrin-bisphenol A condensate having an epoxy equivalent weight of approximately 490 reacted with diethylenetriamine to give an adduct with an amine-epoxy equivalent weight of approximately 84 (curing agent C-111-Shell Chemical Co.).

After aging one month at 23° C., the specimens are subjected to further environmental exposure and tested for tensile strength by ASTM D-1344-57. Immersed specimens are tested while wet after removal from the liquids.

| Exposure Environment | PSI | Days | Remarks |
|---|---|---|---|
| 23° C. 50% RH | 118÷ | 7 | Covering breaks. |
| In 23° C. water | 91 | 7 | |
| In 23° C. water | 83 | 43 | |
| In 50° C. water | 65 | 7 | |
| In 50° C. water | 50 | 43 | |

Three days after coating on cement asbestos board this adhesive is firm and has so little tack that it no longer will bond to the vinyl foam-tile laminate, i.e., pressure-sensitivity is transient.

EXAMPLE 3

This example illustrates the ability of an epoxy resin and curing agent to impart tack and high bond strength to an adhesive composition which without a transient tackifier does not have pressure-sensitive properties. The procedure of Example 2 is followed except that the following adhesive composition is used and other minor changes in procedure as noted are made.

22.6 g. — 44 percent TS anionic 95 acrylate ester: 5 hydroxyethyl methacrylate copolymer latex (Monsanto Shawinigan Lab. prepared latex XP-211).
0.2 g. — 20 percent aq. nonionic surfactant (Igepal CO-880).
1.0 g. — 2 percent aq. polyacrylamide (Polyhall 402).
1.0 g. — 10 percent aq. polyvinyl methyl ether (Gantrez M155).
2.13 g. — 80 percent epoxy resin (Shell Epon No. 152) in toluene.
1.83 g. — Shell Curing Agent C-111

This composition is stirred for six minutes before spreading.

After air drying the above latex adhesive film for six hours the polyvinyl chloride foam backed tile laminates are bonded to it as in Example 2. After 14 days aging the specimens are submitted to environmental conditioning for one week, then tested for tensile strength as in Example 2.

| Environment: | Tensile Strength PSI |
|---|---|
| 23° C., 50% RH | 116* |
| In 23° C. $H_2O$ | 94 |

* Covering breaks

Without the transient tackifying action of the epoxy intermediate and curing agent, this composition has too little tack to form a strong pressure-sensitive bond.

EXAMPLE 4

This example illustrates the high level of bond strength obtained by the process of this invention using a variety of formula constituents and processing conditions. It also illustrates an embodiment wherein a foamed adhesive in a range of densities provides a smooth conformable supporting surface for a high modulus preformed resinous covering.

Examples in Table 1 are for epoxy curing agent modified foamed latex adhesives which are coated 1/16 inch thick on cement asbestos board, air dried without loss of foam structure and used to make cross-lap tensile specimens using 18 psi pressure applied for one minute to form the bonds. The formulations are foamed by stirring with the equipment described in Example 2 at 2,000 to 4,000 rpm.

These examples illustrate the use of a mixture of latices, one of which (Hycar 2600 × 161) contains polymer too soft to have good cohesive strength and the solids of the other latex are varied to improve cohesive strength and control permissible open time for pressure-sensitive bonding in the presence of transient (epoxy-resin intermediates and curing agents) tackifiers. The permissible open time is also influenced by the nature and amount of epoxy resin intermediates and curing agents present.

100 percent acrylic latices of the type used as vehicles for the formulation of latex paints (i.e. those which form continuous but non-tacky films on air drying) are substituted for latex B with similar results.

TABLE I

| Foam No. | Latex Kind [1] | Latex Percent TS | Latex G. | $H_2O$ soluble additives, kind [2] | P.p.h.[3] | Epoxy resins and curing agents, kind [4] | P.p.h.[3] | Foam ht./ unfoamed ht. | Open time, hr.[5] | Tensile bond, p.s.i. Dry [6] | Tensile bond, p.s.i. Wet [7] |
|---|---|---|---|---|---|---|---|---|---|---|---|
| 1 | A | 50 | 20 | Polyhall-295 | 0.2 | Epon 812 | 22.7 | 2.5 | 51 | 21 | 10 |
|  |  |  |  | Gantrez M155 | 1.2 | Shell T-1 | 7.3 |  |  |  |  |
| 2 | A | 50 | 20 | Polyhall-402 | 0.2 |  | 17.4 | 2.5 | 3 | 26 | 16 |
|  |  |  |  | Gantrez M155 | 1.0 | Epon 152 | 19.9 |  |  |  |  |
|  |  |  |  | Igepal CO-880 | 0.4 | Shell C-111 |  |  |  |  |  |
| 3 | A | 50 | 14 | Polyhall-402 | 0.2 |  | 17.1 | 2.1 | 3.5 | 69 | 42 |
|  | B | 50 | 6 | Gantrez M155 | 1.0 | Epon 152 | 19.3 |  |  |  |  |
|  |  |  |  | Igepal CO-880 | 0.4 | Shell C-111 |  |  |  |  |  |
| 4 | A | 50 | 10 | Polyhall-402 | 0.2 | Epon 152 | 17.1 | 2.1 | 3 | 90 | 56 |
|  | B | 50 | 10 | Gantrez M155 | 1.0 | Shell C-111 | 19.3 |  |  |  |  |
|  |  |  |  | Igepal CO-880 | 0.4 |  |  |  |  |  |  |
| 5 | B | 50 | 20 | Polyhall-402 | 0.2 | Epon 152 | 17.1 | 2.1 | 3 | Not pressure sensitive |  |
|  |  |  |  | Gantrez M155 | 1.0 | Shell C-111 | 19.3 |  |  |  |  |
|  |  |  |  | Igepal CO-880 | 0.4 |  |  |  |  |  |  |
| 6 | A | 50 | 10 | Polyhall-402 | 0.2 | Epon 152 | 20.5 | 2.8 | 3 | 98 | 50 |
|  | B | 50 | 10 | Igepal CO-880 | 0.4 | Shell U | 4.7 |  | 27 |  | 20 |
| 7 | A | 50 | 10 | Polyhall-402 | 0.2 | Epon 152 | 20.5 | 2.5 | 3 | 105 | 56 |
|  | B | 50 | 10 | Igepal CO-880 | 0.4 | Shell U | 4.7 |  | 24 |  | 50 |
|  |  |  |  | Carboset 515 (TEA) | 10.0 |  |  |  |  |  |  |
| 8 | A | 50 | 10 | Polyhall-402 | 0.2 | Epon 152 | 21.9 | 2.1 | 3 | 92 | 62 |
|  | B | 50 | 10 | Igepal CO-880 | 0.4 | Shell U | 3.4 |  |  |  | 55 |

[1] A: Hycar 2600×161 (acrylate ester/methylol acrylamide copolymer); B: Hycar 1572 (carboxylated acrylonitrile/butadiene copolymer).
[2] Polyhall-295, Stien-Hall Co., carboxypolyacrylamide; Polyhall-402, Stien-Hall Co., polyacrylamide; Gantrez M155, General Aniline and Film Co., polyvinylmethyl ether; Carboset 515-TEA (contains Carboset 515 and a stoichiometric equivalent of triethylamine. Alternate nomenclature is triethylamine salt of Carboset 515) used as 50% aqueous solution, B. F. Goodrich Chemical Co., carboxy acrylate ester; Igepal CO-880, General Aniline and Film Co., alkyl phenol; ethylene oxide adduct.
[3] P.p.h.—Parts neat additive per 100 parts by weight of latex solids.
[4] All products listed here are products of Shell Chemical Co.:
Epon 812.—A glycidated aliphatic polyol with an epoxy equivalent weight of approximately 150.
Epon 152.—A glycidated phenol-formaldehyde novolac with an epoxy equivalent weight of approximately 175.
Shell T-1.—A diethylene triamine/ethylene oxide adduct with an amine-epoxy equivalent weight of approximately 38 containing bisphenol A as an accelerator.
Shell C-111.—A 42% solids solution in organic solvent of an epichlorohydrin-bisphenol A condensate having an epoxy equivalent weight of approximately 190 reacted with diethylenetriamine to give an adduct with an amine-epoxy equivalent weight of approximately 84.
Shell U.—An adduct similar to Shell T-1 but 100 percent solids and the epoxy condensate has an epoxy equivalent weight of approximately 90 and the diethylenetriamine adduct has an amine-epoxy equivalent weight of approximately 40.
[5] Time from application of adhesive to time of contacting adhesive to adherend.
[6] Aged 14 days at 23° C. and 50% RH.
[7] Aged 7 days in laboratory, immersed in 50° C. water for 7 days, then tested while wet but at 23° C.

REMARKS.—The cured cohesive strength of the formed adhesives are enhanced by adding latex B. Complete replacement of latex A by B however resulted in loss of pressure-sensitive bonding capability. This illustrates versatility of formulations as well as limits to formulation variability.

Using equal amounts of A and B latices and approximately stoichiometric amounts of Epon 152 with Curing Agent U gives excellent bonds but with open time limited to something less than 24 hours with good water resistance as the criteria. Open time is extended to 24 hours by using about a 50% excess of Epon 152 with Curing Agent U, or by using stoichiometric amounts along with water soluble, but reactive Carboset 515 (Foam 8).

EXAMPLE 5

This example illustrates the process of applying a high modulus preformed resinous covering to an irregular architectural surface using a foamed adhesive composition of this invention which provides a smooth supporting surface for the covering.

Two 7004.3 gram batches of foamed epoxy modified pressure-sensitive latex adhesive are prepared for this use and the following details the procedure and materials to be used for the preparation of one batch.

A five gallon capacity polyethylene pail is charged in order with:

A. 5820 grams of a 1:1 mixture by weight of B. F. Goodrich Chemical Company Hycar 2600 × 161 and Hycar 2600 × 84 acrylic latices (50 percent TS);

B. 378.3 grams of a solution of 2.91 grams Hercules Chemical Company CMC–70-SH sodium carboxymethyl cellulose and 87.3 grams Shell Chemical Company Epon Curing Agent T (ethylene oxide polyamine adduct) in 288.1 grams of water; and C. 806.0 grams of a mixture of 428 grams of a 75 percent by weight solution of a partially resinified adduct of epichlorohydrin and an aliphatic polyol having an epoxy equivalent weight of approximately 70 (Epon 872 – Shell Chemical Co.) in xylene and 378 grams of an 85 percent by weight solution of a bisphenol A/epichlorohydrin condensate with an epoxy equivalent weight of approximately 190 (Epon 828 – Shell Chemical Co.) in toluene.

A wire whip stirrer of the type used for food preparation consisting of twelve 0.08 inch diameter wires, bent to form a round cage about 5 inch in diameter and 6 ½ inch high, is lowered into the center of the charge and about 1 inch from the bottom. The whip is then driven at approximately 1000 r.p.m. for 13 minutes. During this time the volume of adhesive is increased from seven liters (unfoamed) to about 14.5 liters. The foamed adhesive is of very smooth uniform texture and pourable consistency.

Portions are then poured on the concrete floor and spread to give complete coverage of the surface and a smooth supporting surface for covering. A total of 9771 grams of foamed adhesive is used on 259 ft$^2$ of floor corresponding to about 38 g/ft$^2$. After air drying about three hours, 18 inch × 18 inch panels of high modulus preformed resinous coverings which are previously primed on the side to be adhered with about 1 gram (dry) of Bostik 7130 polyester urethane solution and aged about three months are laid on the dry foam and pressed with firm finger pressure. The instantaneous bond so formed is of such strength that it is impossible to remove a panel intact. Removal can only be accomplished by chipping away small pieces with a hammer and chisel.

About 80 percent of the foam contact area is covered the same day the foam is applied to the floor. The remaining coated area is covered by the end of the next day and again strong pressure sensitive bonding is noted. Three days after foam application the small coated border area extending beyond the edges of the tile loses it tack and will no longer form pressure sensitive bonds with a primed covering.

EXAMPLE 6

This example illustrates the process of applying a preformed resinous covering to an architectural surface using an adhesive composition of this invention. A 7000 G. batch of the adhesive composition of Example 3 is prepared in the equipment described in Example 5 except that a propeller type agitator operating at a tip speed of 700 feet per minute is used to mix the composition so that only minor amounts of air, if any, are entrained. A carton of eight inch by eight inch by .080 inch plasticized polyvinyl chloride tiles is obtained from a commercial source. To a number of the tiles, a prime coat of polyester urethane primer is applied as in Example 5. The adhesive is applied to a concrete architectural surface below ground level. As soon as the adhesive is dry the tiles are pressed on the dry adhesive surface with firm finger pressure. A strong instantaneous bond is formed between the tile and the adhesive. In trying to remove the tiles from the surface immediately after the bond is formed several of the tiles are removed only with great difficulty because of the strength of the bond. Although both primed and unprimed tile form a strong bond, it is noted that the primed tile exhibit a slightly stronger bond. The covered surface is returned to service within four hours after completion of installation. After several days no flow of adhesive at tile joints is noted. After several months of normal maintenance with weekly mopping with detergent and water, no loss of bond strength or buckling or curling of tile is noted.

EXAMPLE 7

This example illustrates the use of a temporary lubricant solution which allows the applier to slidably position a covering while in contact with the pressure-sensitive adhesive compositions of this invention for a short time after the solution is applied to the covering or the adhesive surface.

In applying a covering as in Example 5, there are areas in which it is difficult to accurately position the covering when placing it in contact with the dry pressure sensitive adhesive compositions of this invention. A 1 percent by weight aqueous solution of polyvinyl methyl ether is wiped on to the adhesive surface using a cloth moistened with the solution. The covering is placed on the adhesive surface and slid into final desired position. Within one minute the covering cannot be moved without disturbing the surface of the adhesive because of a bond forming between the adhesive and the covering. Within an hour the covering is firmly bonded to the architectural surface and cannot be removed without great difficulty. After several months of use under variable dry and moist conditions no difference is noted in bond strength in comparison to that of covering panels to which the lubricant solution is not applied. In areas where overhanging obstructions are very close to the architectural surface, it is more convenient to apply the lubricant solution to the preformed resinous covering. When the lubricant solution is applied to the preformed resinous covering, the same results are obtained as described above when the lubricant is applied to the adhesive surface.

What is claimed is:

1. A process which comprises adhering a preformed resinous covering to an architectural surface by a pressure-sensitive adhesive composition comprising an acrylic ester copolymer latex and a transient tackifier, which transient tackifier comprises an epoxy resin and a curing agent for the epoxy resin.

2. The process of claim 1 wherein the preformed resinous covering is a preformed high modulus resinous covering having a flexural modulus of at least 1,000,000 pounds per square inch.

3. The process of claim 2 wherein a foam layer is interposed between said covering and said architectural surface to provide a conformable supporting surface for said covering.

4. The process of claim 3 wherein said foam layer is in sheet form and is adhered to said covering and said architectural surface.

5. The process of claim 4 wherein said foam layer is a polymeric foam selected from the group which consists of foams of polyvinyl chloride, polystyrene, polyurethane, polypropylene and phenol-formaldehyde resin.

6. The process of claim 3 wherein said foam layer is a pressure sensitive adhesive composition comprising a latex, a water-soluble colloid, said water-soluble colloid being a high polymer having a molecular weight in excess of 20,000 and being soluble in media selected from the group which consists of water and aqueous alkaline media and a transient tackifier, which transient tackifier comprises an epoxy resin and a curing agent for the epoxy resin.

7. The process of claim 6 wherein the foamed adhesive composition, when applied, occupies from about 1.2 to about four times its pre-foamed volume.

8. The process of claim 6 wherein said foamed adhesive composition comprises a latex, the solids of which latex comprise from about 40 percent by weight to about 95 percent by weight of the total solids content of said composition, an epoxy resin and a curing agent for the epoxy resin, which resin and curing agent together are present as a combination in the amount of from about five to about 50 parts by weight per 100 parts by weight of latex solids, and in which combination of epoxy resin and curing agent said curing agent is present in the amount of from about 25 percent by weight of the stoichiometric amount of the curing agent to fully react with the epoxy resin to about 200 percent by weight of said stoichiometric amount, a surfactant selected from the group which consists of an anionic surfactant and a nonionic surfactant in the amount of from 0 to about 3 parts by weight per 100 parts by weight of latex solids and a water-soluble colloid in the amount of from about 0.01 to about 2.0 parts by weight per 100 parts by weight of latex solids.

9. A process which comprises adhering a preformed resinous covering to an architectural surface by a pressure-sensitive composition comprising a copolymer latex selected from the group which consists of an acrylic ester-unsaturated acid copolymer and an acrylic ester-hydroxyl functional monomer copolymer in combination with a terpolymer selected from the group which consists of acrylonitrile-butadiene unsaturated acid and acrylonitrile-isoprene-unsaturated acid in which combination said terpolymer solids comprise from 0 to 60 percent by weight of the total latex solids of the combination; an epoxy resin selected from the group which consists of a glycidyl ether of an aliphatic polyol, a glycidyl ether of a phenol containing more than one phenolic group and a mixture of a glycidyl ether of an aliphatic polyol and a glycidyl ether of a phenol containing more than one phenolic group and which has an epoxy equivalent weight from about 150 to about 1000; a curing agent selected from the group which consists of an aliphatic amine and an aliphatic polyamine modified by partial reaction of amine functionality with a reactant selected from the group which consists of ethylene oxide, propylene oxide, and a glycidyl ether; a surfactant selected from the group which consists of an alkyl phenol having from eight to 13 carbon atoms reacted with 10 to 50 equivalents of ethylene oxide, a condensed phosphate ester salt, an alkyl aryl ethylene oxide sulfonate and an alkyl phenol-ethylene oxide adduct; and a water soluble colloid selected from the group which consists of polyacrylamide and carboxymethyl cellulose.

10. The process of claim 1 wherein the preformed resinous covering is a composition comprising
  a. from about 10 to about 95 percent by volume based on the total composition of an inorganic filler having a M0hs' hardness of at least about 4, and
  b. from about 90 to about 5 percent by volume based on the total composition of a polyalkylmethacrylate.

11. The process of claim 10 wherein said polyalkylmethacrylate is polymethylmethacrylate.

12. The process of claim 10 wherein the preformed resinous covering has a flexural modulus of at least 1,000,000 pounds per square inch.

13. The process of claim 1 wherein said architectural surface is a floor.

14. The process of claim 1 wherein said architectural surface is a floor located below ground level.

15. The process of claim 1 wherein said architectural surface is a wall.

16. The process of claim 1 wherein said pressure sensitive adhesive composition comprises a latex, the solids of which latex comprise from about 40 to about 95 percent by weight of the total solids content of said composition, an epoxy resin and a curing agent for the epoxy resin, which resin and curing agent together are present as a combination in the amount of from about 5 to about 50 parts by weight per 100 parts by weight of latex solids, and in which combination of resin and curing agent said curing agent is present in the amount of from about 25 percent by weight of the stoichiometric amount of the curing agent to fully react with the epoxy resin to about 200 percent by weight of said stoichiometric amount.

17. The process of claim 1 wherein said latex is selected from the group which consists of an acrylic ester-hydroxyl functional monomer terpolymer, an acrylic ester-vinyl ester-hydroxyl functional monomer terpolymer, an acrylic ester-vinyl ester-carboxyl functional monomer terpolymer, an acrylic ester-vinyl ester-glycidyl functional monomer terpolymer, an acrylic ester-butadiene-hydroxyl functional monomer terpolymer, an acrylic ester-butadiene-carboxyl functional monomer terpolymer, an acrylic ester-butadiene-glycidyl functional monomer terpolymer, an acrylic ester-isoprene-hydroxyl functional monomer terpolymer, an acrylic esterisoprene carboxyl functional monomer terpolymer, an acrylic ester-isoprene-glycidyl functional monomer terpolymer, an acrylic ester-vinyl ether-hydroxyl functional monomer terpolymer, an acrylic ester-vinyl ether-carboxyl functional monomer terpolymer and an acrylic ester-vinyl ether-glycidyl functional monomer terpolymer.

18. The process of claim 17 wherein said latex is used in combination with a latex selected from the group which consists of an acrylonitrile-butadiene-unsaturated acid terpolymer and an acrylonitrile-isoprene-unsaturated acid terpolymer which latter latex is present in the amount of from 0 to about 70 percent by weight of total latex solids of the combination.

19. The process of claim 1 wherein said epoxy resin is selected from the group which consists of a glycidyl ether of an aliphatic polyol, a glycidyl ether of a phenol containing more than one phenolic group and a mixture of a glycidyl ether of an aliphatic polyol and a glycidyl ether of a phenol containing more than one phenolic group.

20. The process of claim 1 wherein said epoxy resin is dissolved in an organic solvent.

21. The process of claim 1 wherein said curing agent is selected from the group which consists of an aliphatic polyamine and an aliphatic polyamine modified by partial reaction of amine functionality with a reactant selected from the group which consists of ethylene oxide, propylene oxide and a glycidyl ether.

22. The process of claim 1 wherein a primer is applied to said covering before said covering is adhered to said architectural surface.

23. The process of claim 22 wherein said primer is a polyester urethane composition.

24. The process of claim 1 wherein said adhesive composition additionally includes a tackifier, said tackifier being a low molecular weight polymer which is insoluble in water but soluble in alkaline aqueous media and organic solvents and is present in the amount of from 10 to about 40 parts by weight per 100 parts by weight of latex solids.

25. The process of claim 1 wherein said latex, said epoxy resin and said curing agent are mixed together after being maintained separate from each other until about four hours before said adhesive composition is applied.

26. The process of claim 1 wherein said covering is placed in contact with said applied adhesive composition during the time period extending from about when the adhesive compsition is dry to about 3 days after the adhesive composition is dry.

27. The process of claim 1 wherein initial tack of the pressure-sensitive adhesive composition is temporarily destroyed by application of a temporary lubricant solution, said temporary lubricant solution being a dilute aqueous solution of polyvinyl methyl ether in a concentration from about 0.1 weight percent to about 3 weight percent, to a surface without diminishing the dry and wet strength of the adhesive bond.

28. The process of claim 27 wherein the temporary lubricant solution is applied to an adhesive surface.

29. A process for adhering a preformed high modulus polymethyl-methacrylate covering having a flexural modulus of at least 1,000,000 pounds per square inch to a floor by a pressure-sensitive adhesive composition comprising a latex which comprises an acrylate ester/methylol acrylamide copolymer, the solids of which latex are present in the amount of from about 55 to about 92 percent by weight of the total adhesive composition solids, a transient tackifier in the amount of from about 10 to about 40 parts by weight per 100 parts by weight of latex solids, which transient tackifier comprises an epoxy resin comparising a mixture of a partially resinified condensate of epichlorohydrin and an aliphatic polyol having an epoxy equivalent weight of approximately 70 and a bisphenol A/epichlorohydrin condensate with an epoxy equivalent weight of approximately 190 in an organic solvent and an ethylene oxide/polyamine adduct curing agent, which curing agent is present in the amount of from about 80 percent by weight of the stoichiometric amount of the curing agent to fully react with the epoxy resin to about 120 percent by weight of said stoichiometric amount, and a sodium carboxymethyl cellulose water-soluble colloid in the amount of from about 0.05 to about 1 part by weight per 100 parts by weight of latex solids in which process said pressure-sensitive adhesive composition is mixed and foamed to the extent that, when applied, said foamed composition occupies from about 1.8 to about 2.5 times its pre-foamed volume and is applied to said floor within about 4 hours after said composition is mixed together and said covering is placed with firm finger pressure in contact with said applied adhesive composition during a period extending from about as soon as said adhesive composition is dry to the end of the next day.

30. The process of claim 29 wherein said latex comprises an acrylate ester/unsaturated acid copolymer.

31. A process for adhering a preformed high modulus polymethyl-methacrylate covering having a flexural modulus of at least 1,000,000 pounds per square inch to a floor by a pressure-sensitive adhesive composition comprising a latex which comprises a vinyl acetate/acrylic ester copolymer, the solids of which copolymer are present in the amount of from about 55 to about 92 percent by weight of the total adhesive composition solids, and a transient tackifier in the amount of from about 10 to about 40 parts by weight per 100 parts by weight of latex solids, which transient tackifier comprises an epoxy resin comprising a glycidated phenol-formaldehyde novolac with an epoxy equivalent weight of approximately 175 and a curing agent which comprises a 42 percent solids solution in organic solvent of an epichlorohydrinbisphenol A condensate having an epoxy equivalent weight of approximately 490 reacted with diethylenetriamine to give an adduct with an amine-epoxy equivalent weight of approximately 34, which curing agent is present in the amount of from about 80 percent by weight of the stoichiometric amount of the curing agent to fully react with the epoxy resin to about 120 percent by weight of said stoichiometric amount, in which process a plasticized polyvinyl chloride foam is interposed between said covering and said floor, which foam provides a conformable smooth supporting surface for said covering, said foam is laminated to said covering, a polyester urethane primer is applied to an exposed surface of said foam, said adhesive composition is applied to said floor within four hours after said composition is mixed together and the primed foam surface of the covering foam laminate is placed with firm finger pressure is contact with said applied adhesive composition during a period extending from about as soon as said adhesive composition is dry to the end of the next day.

32. The process of claim 31 wherein said latex comprises an acrylic ester/methylol acrylamide copolymer.

33. The process of claim 31 wherein said latex comprises an acrylic ester/unsaturated acid copolymer.

* * * * *